United States Patent [19]

Hicks

[11] Patent Number: 5,589,014
[45] Date of Patent: Dec. 31, 1996

[54] METHOD FOR FORMING PLEATS IN A SHEET-LIKE MATERIAL

[75] Inventor: Dennis G. Hicks, Neenah, Wis.

[73] Assignee: Converting, Inc., Clintonville, Wis.

[21] Appl. No.: 277,276

[22] Filed: Jul. 21, 1994

Related U.S. Application Data

[62] Division of Ser. No. 983,472, Dec. 3, 1992, Pat. No. 5,389,188.

[51] Int. Cl.⁶ .................................................. B32B 31/08
[52] U.S. Cl. ...................... 156/73.1; 156/204; 156/205; 156/207; 156/210; 156/227
[58] Field of Search ................................ 156/473, 205, 156/204, 207, 474, 210, 227, 472, 477.1, 470, 449, 443, 196, 73.1; 428/181, 183; 223/28, 30, 32; 493/405, 406, 416, 424, 426, 428, 432, 434, 435, 436; 269/21; 425/369, 388

[56] References Cited

U.S. PATENT DOCUMENTS

| | | | |
|---|---|---|---|
| 212,723 | 2/1879 | Meech | 156/472 |
| 1,265,708 | 5/1918 | Clark | 223/32 |
| 1,981,338 | 11/1934 | Swift, Jr. | 156/473 |
| 2,144,513 | 1/1939 | Smith | 428/181 |
| 2,167,759 | 8/1939 | Karfiol | 428/181 |
| 2,384,676 | 9/1945 | Hill | 156/470 |
| 2,415,375 | 2/1947 | Sedgley . | |
| 2,571,978 | 10/1951 | Watson | 156/472 |
| 2,632,495 | 3/1953 | Agee . | |
| 2,666,472 | 1/1954 | Hosfield | 156/474 |
| 2,874,754 | 2/1959 | Yost et al. | 156/474 |
| 3,132,985 | 5/1964 | Moore | 156/474 |
| 3,141,666 | 7/1964 | Ashton | 493/434 |
| 3,723,222 | 3/1973 | Kurita et al. | 156/210 |
| 3,736,209 | 5/1973 | Carpenter . | |
| 3,854,861 | 12/1974 | Worrall | 156/205 |
| 3,874,963 | 4/1975 | Barger . | |
| 3,982,978 | 9/1976 | Carpenter | 156/205 |
| 4,036,414 | 7/1977 | Miranda . | |
| 4,338,154 | 7/1982 | Berthelot et al. | 156/473 |
| 4,348,250 | 9/1982 | Bromley | 156/473 |
| 4,353,774 | 10/1982 | Zaehringer . | |
| 4,381,212 | 4/1983 | Roberts | 156/473 |
| 4,447,285 | 5/1984 | Lussana et al. | 156/473 |
| 4,627,831 | 12/1986 | Hirakawa et al. | 156/205 |
| 4,650,102 | 3/1987 | Arbetter . | |
| 4,650,251 | 3/1987 | Shimada . | |
| 4,668,316 | 5/1987 | Sager . | |
| 4,808,252 | 2/1989 | Lash | 156/73.1 |
| 4,851,178 | 7/1989 | Wendt | 425/388 |
| 4,873,048 | 10/1989 | Jarvenkyla | 425/388 |
| 4,976,673 | 12/1990 | Smith et al. . | |
| 4,976,677 | 12/1990 | Siversson | 156/474 |
| 5,062,825 | 11/1991 | Smith et al. . | |

FOREIGN PATENT DOCUMENTS 47-46030  11/1972  Japan .

*Primary Examiner*—Michele K. Yoder
*Attorney, Agent, or Firm*—Roylance, Abrams, Berdo & Goodman, L.L.P.

[57] ABSTRACT

A method and apparatus are provided for forming pleats in a thermoplastic material by feeding a continuous web of sheet-like thermoplastic material to a pleat forming apparatus and subsequently drawing the web through a bonding device. The pleat forming apparatus includes a rotating drum that has a plurality of apertures and a plurality of radially extensible teeth positioned in peripheral slots. The teeth are spring-biased inwardly to a retracted position within the drum but are extendable, under the urging of an internal cam, to a position wherein a portion of each tooth protrudes outwardly from the drum. The web is carried around the drum and the teeth protrude into the web forming pleats.

7 Claims, 10 Drawing Sheets

METHOD FOR FORMING PLEATS IN A SHEET-LIKE MATERIAL

This is a division of application Ser. No. 07/983,472, filed Dec. 3, 1992, now U.S. Pat. No. 5,389,188.

BACKGROUND OF THE INVENTION

The invention relates generally to an apparatus and method for forming pleats or ruffles in a sheet-like material, in particular a thermoplastic material. The invention also relates to a laminated sheet-like article having pleats or ruffles formed therein.

In a variety of sheet-like products such as decorations, curtains, wall or floor coverings, and table skirting material, pleats or ruffles may be desired on the entire surface or adjacent one edge of the material. In the manufacture of such articles, it is desirable to produce the pleats or ruffles in a quick and reliable manner. For purposes of the description which follows, the terms "pleat" and "ruffle" shall be regarded as equivalent.

A variety of methods have been employed to form pleats in a sheet-like material. Typically, the methods involve the use of a sewing machine that gathers the material to form pleats and needle stitches the pleats to hold them in place. Typically, an oscillating ruffling blade is used to gather the material into ruffles. Another device known for forming pleats in sheet-like material is disclosed in U.S. Pat. No. 2,632,495 to Agee. In that device, a single layer of material is passed between three co-acting rollers, two of the rollers rotating at a rate greater than that of the third roller. The material is urged by the first two rollers toward the slower rotating roller, causing the material to double over itself forming pleats. These pleats are then held together by tape.

A disadvantage of the conventional methods of pleating is a general lack of uniformity in the spacing and size of the resulting pleats due to the manner in which the pleats are gathered and formed. For example, the ruffling blades of the conventional sewing machines typically do not gather an equal amount of material per pleat so that the size of the resulting pleats is inconsistent. Due to this inconsistent gathering and to a general lack of control over the precise timing of the oscillation of the blades, the spacing of the pleats is typically not uniform.

SUMMARY OF THE INVENTION

In one aspect of the invention, pleats are formed in a thermoplastic material by feeding a continuous web of sheet-like thermoplastic material to a pleat-forming apparatus and continuously drawing the web through the apparatus. The pleats are formed by passing the web of material around the outer surface of a continuously rotating drum that has a plurality of apertures therein. A plurality of radially extensible, spring-biased teeth are mounted within the drum. The teeth are retractable to a position within the drum and are extendable to a position whereby a first end of each tooth protrudes outwardly from the outer surface of the drum when urged to do so by a cam positioned within the drum.

A vacuum manifold adjacent to the drum selectively directs vacuum to sections of the drum which engage the web of sheet-like material, thus drawing the material against the protruding teeth and the surface of the drum to form the pleats. At a drum position where the pleats have been formed, the cam no longer acts on the teeth, and the teeth retract. The pleats remain due to the vacuum acting upon the material between the pleats. The material and pleats then pass between the drum and a transfer roller, where the pleats are trapped between a pair of endless belts carried around the drum and a pair of endless belts carried around the transfer roller. The belts continue to hold the material as it is guided to a bonding device.

Before passing through the bonding device, a continuous web of backing material is brought to bear against the portion of the material where the pleats have been formed. At the bonding device, the backing material is bonded to the pleated material.

Optionally, a second backing material may be joined to the first backing material. The second backing material may be in the form of an adhesive tape with a pressure-sensitive adhesive on both sides.

BRIEF DESCRIPTION OF THE DRAWINGS

Further objects and advantages of the disclosed invention will become apparent from a reading of the following description when read in conjunction with the accompanying drawings, in which.

DETAILED DESCRIPTION OF THE PREFERRED EMBODIMENTS

Figure 1:
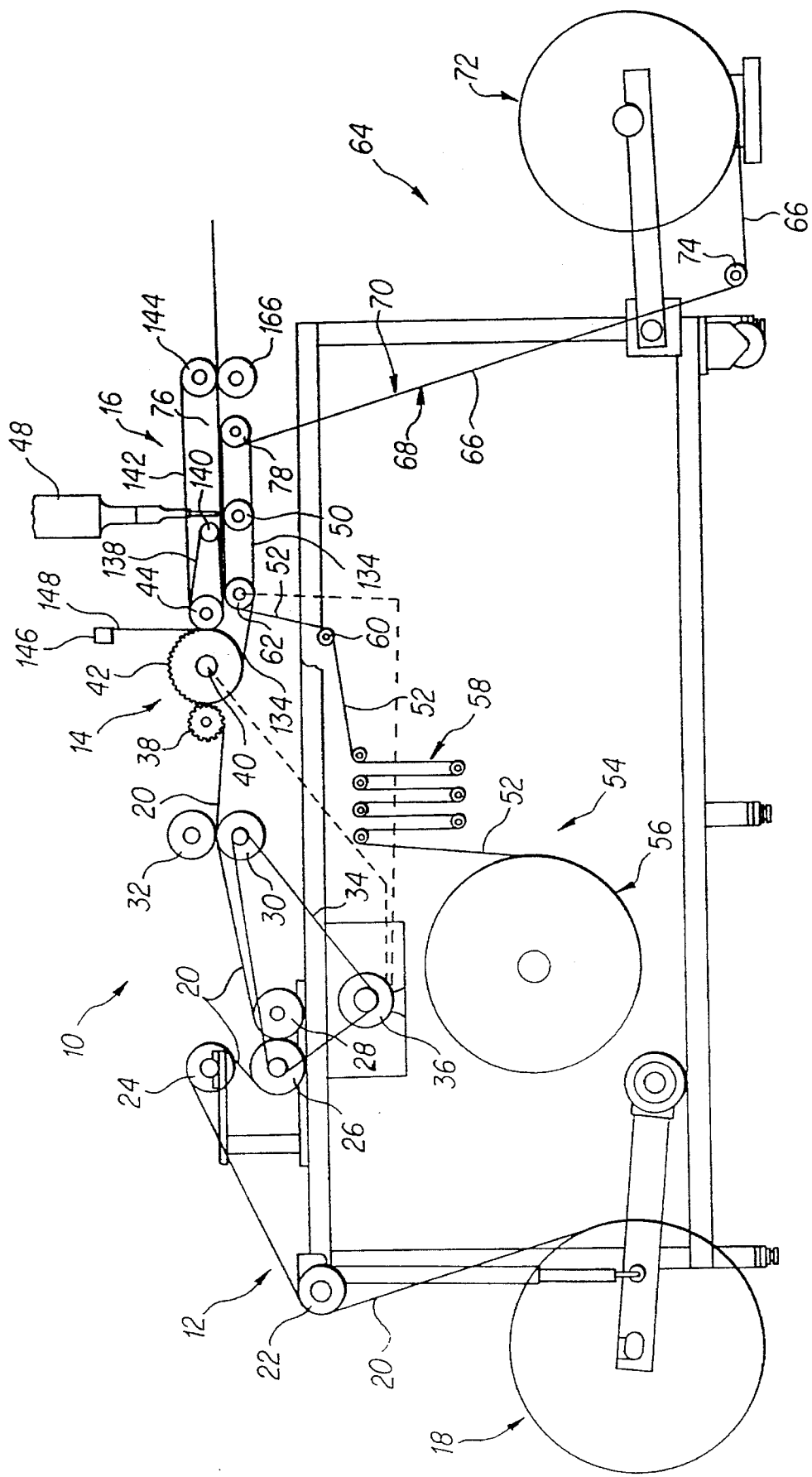
FIG. 1 is a schematic side view of a pleating apparatus in accordance with the present invention.

With reference to the drawings, wherein like reference characters represent like components throughout the various views, and with particular reference to FIG. 1, there is depicted a pleat forming apparatus designated generally by the reference numeral 10. The apparatus includes a material feed station 12, a pleat forming station 14, and a bonding or welding station 16. The material feed station 12 includes a roll 18 which carries a web of sheet-like material 20 to be pleated. The web material 20 is preferably a 1.85 mil thick embossed polyethylene film material, but may be any of a variety of thermoplastic materials available in web form. The web material 20 is fed to the pleat forming station 14 by a series of feed tension rollers 22, 24, 26, 28, 30 and 32. Rollers 26 and 30 are belt driven by a timing belt 34 coupled to a drive motor 36 in a manner generally known in the art in order to pull the web material 20 from the roll 18 and deliver it to the pleat forming station 14.

Figure 2:
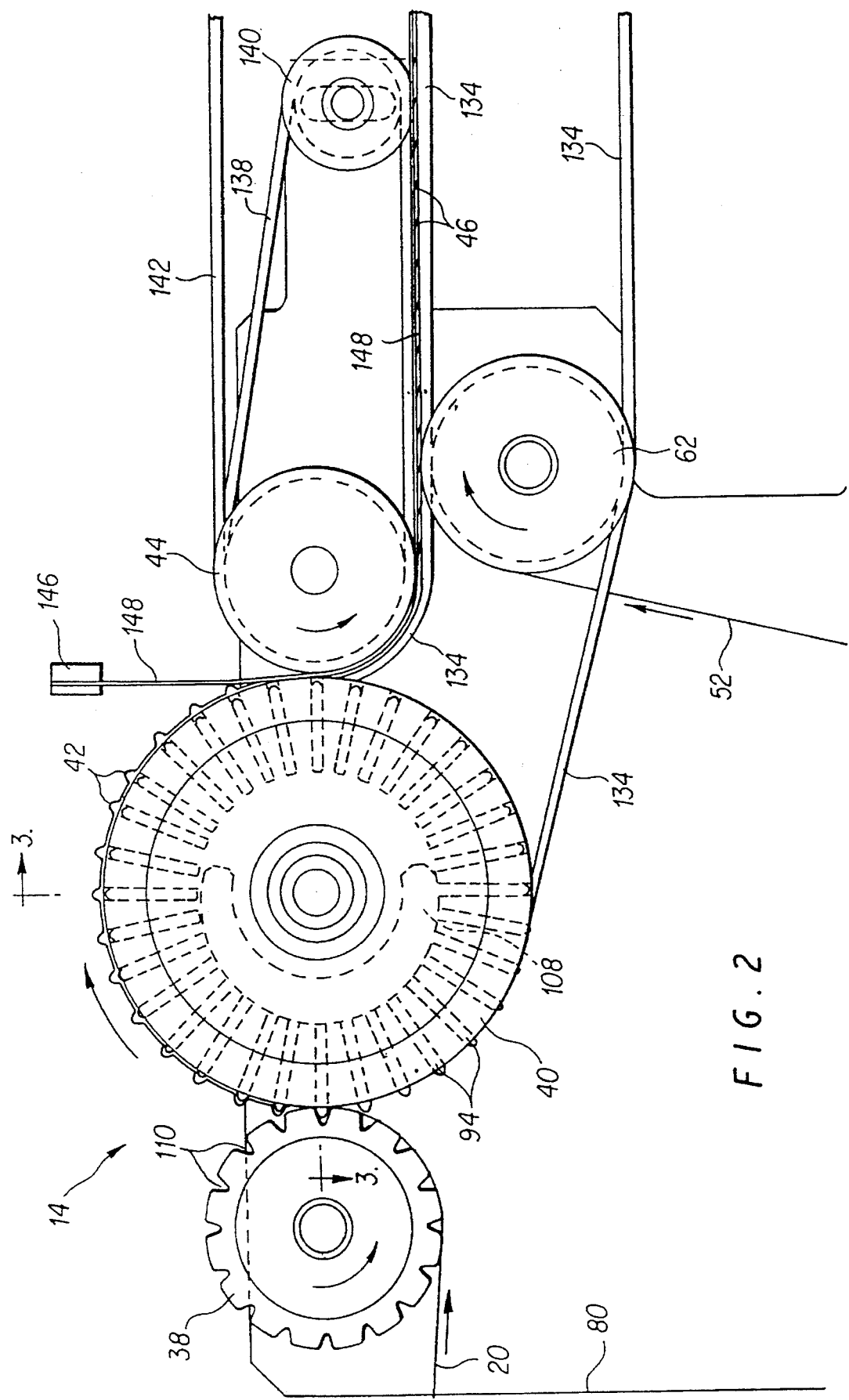
FIG. 2 is an enlarged side view of the pleat forming station of the pleating apparatus shown in FIG. 1.
Figure 6:
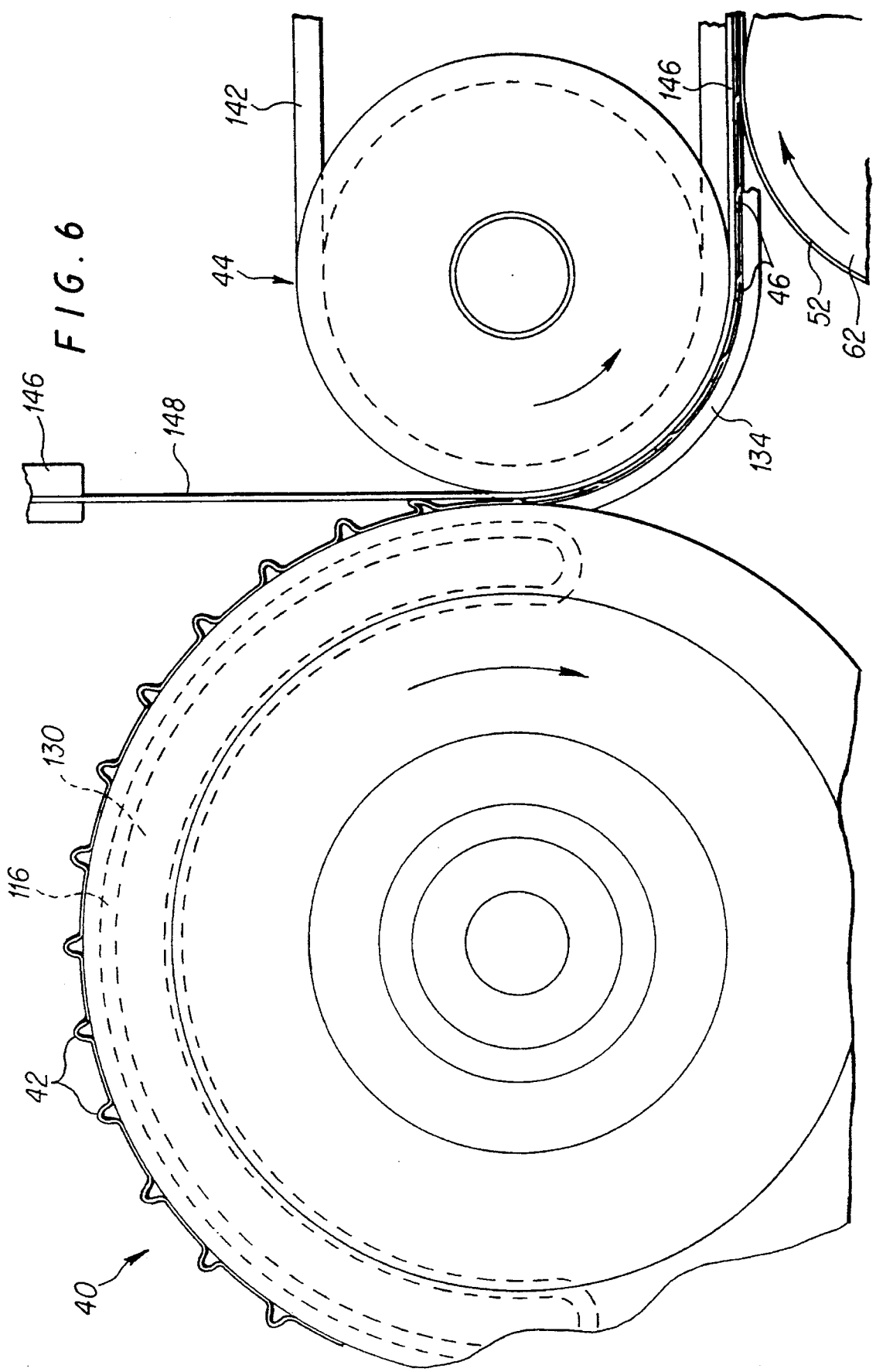
FIG. 6 is an enlarged side view of the pleating station illustrating the formation of pleats.
Figure 8:
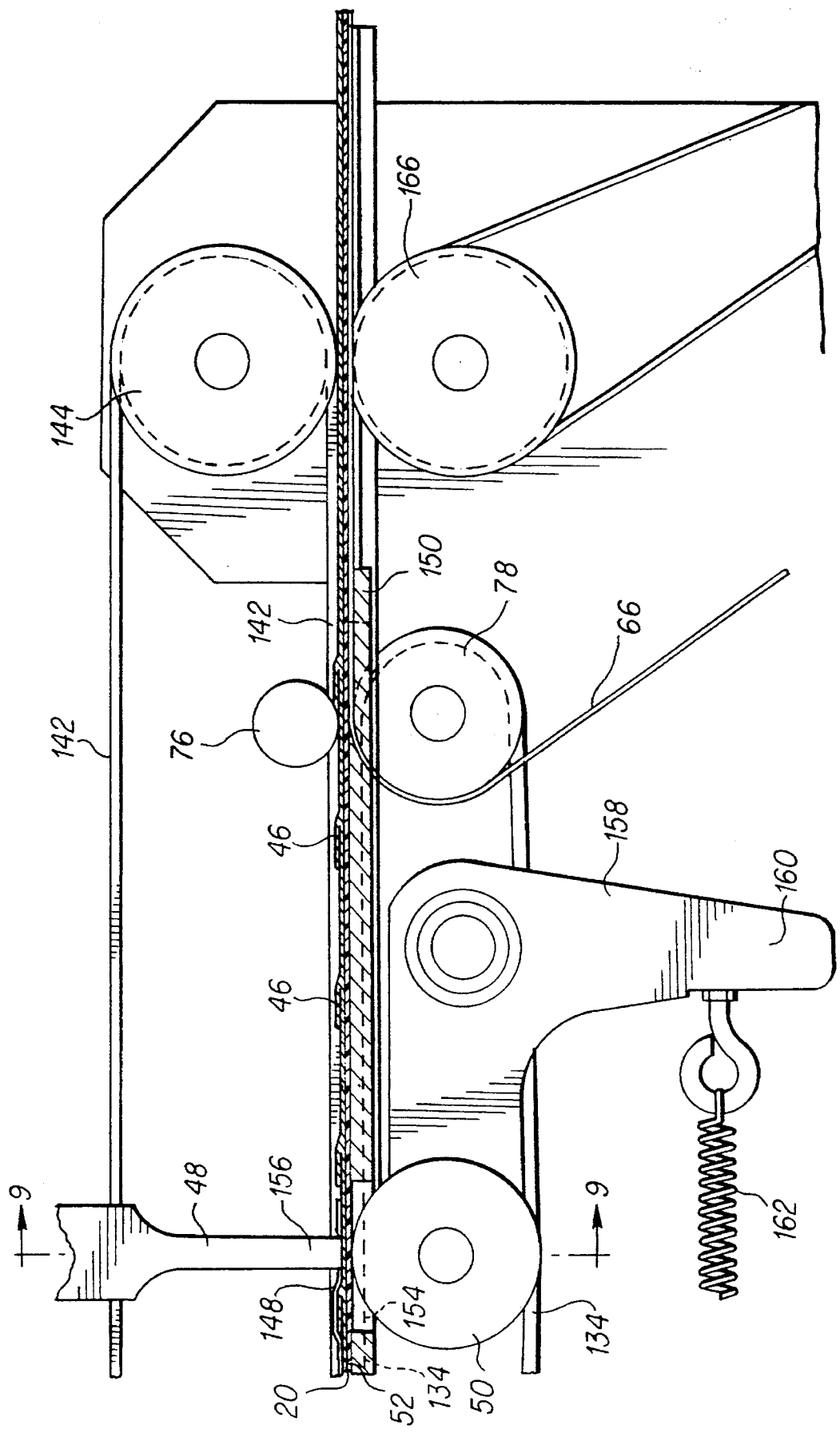
FIG. 8 is a side view of the bonding station of the apparatus of FIG. 1.

At the pleat forming station 14, the web material 20 is drawn between a female pleating roller 38 and a pleating drum 40, around the pleating drum 40 such that protruding pleats 42 are formed, and between the pleating drum 40 and a transfer roller 44 where the protruding pleats 42 are folded over to form flat pleats 46 (shown in FIGS. 2, 6 and 8). The pleat forming station 14 is described in further detail below.

From the pleat forming station 14, the web material with the folded, flat pleats 46 is delivered to the bonding station 16. At the bonding station 16, the pleats 46 are bonded to prevent them from unravelling. In a preferred embodiment, the bonding station 16 includes an ultrasonic welding device 48, such as a Model No. 901 welding device manufactured by Branson Ultrasonics Corporation of Danbury, Conn., and a pair of complementary standard ultrasonic stitching anvils 50.

It should be appreciated that, as an alternative, a different bonding device can be employed. For example, the pleats 46 may be bonded using either a conventional heat bonding device, a stitch forming device such as a sewing machine, or a laser.

In a preferred embodiment, a backing material 52 is bonded to the back side of the web material 20, opposite the pleats 46. The backing material 52 is preferably made of 6 mil thick, low density polyethylene, approximately 1.5 inches wide, but may be made of any of a variety of thermoplastic films commercially available. The backing material provides reinforcement for the bonded pleats. The apparatus 10 preferably includes a backing material feeding station 54 which has a feed roll 56 for carrying the backing material web 52. The backing material web 52 is delivered to the bonding station 16 past a tension roller assembly 58, roller 60, and backing roller 62.

Optionally, a tape feed and applying station 64 may be provided for supplying a web 66 of double-sided adhesive tape. One side 68 of the tape 66 is applied to the backing material 52 bonded to the pleated material 20. On the other side 70 of the tape 66 is a liner that may be removed by the user so that the pleated material may be adhered to a surface such as the edge of a table. A tape roll 72, preferably having a conventional drag brake (not shown) as is well known in the art, is provided for carrying the tape 66. The tape 66 is drawn from the tape roll 72, around roller 74, and between a spring-loaded pressure roll 76 and an idler roller 78.

The adhesive on each side of the tape 66 is preferably a pressure-sensitive adhesive such that pressure exerted against the tape will cause the adhesive to bond to an adjacent surface, as is well known in the adhesive art. When the adhesive on the exposed side 68 of the tape 66 is brought to bear against the backing web 52 at the spring-loaded roller 76 and roller 138, the spring-loaded roller 76 acts against the roller 138 causing the adhesive on the exposed side 68 of the tape 66 to bond with the backing web 52 previously bonded to the web 20. Preferably, the adhesive on the exposed side 68 of the tape 66 is a relatively high-strength adhesive so that a secure bond can be formed between the tape 66 and the backing material 52. The adhesive on the liner side 70 of the tape 66 preferably is a relatively low-strength adhesive so that the liner can be easily removed from the tape without pulling the tape 66 from the backing 52, and the pleated material can easily be detached from a surface, such as a table edge, on which it is applied.

Figure 3:
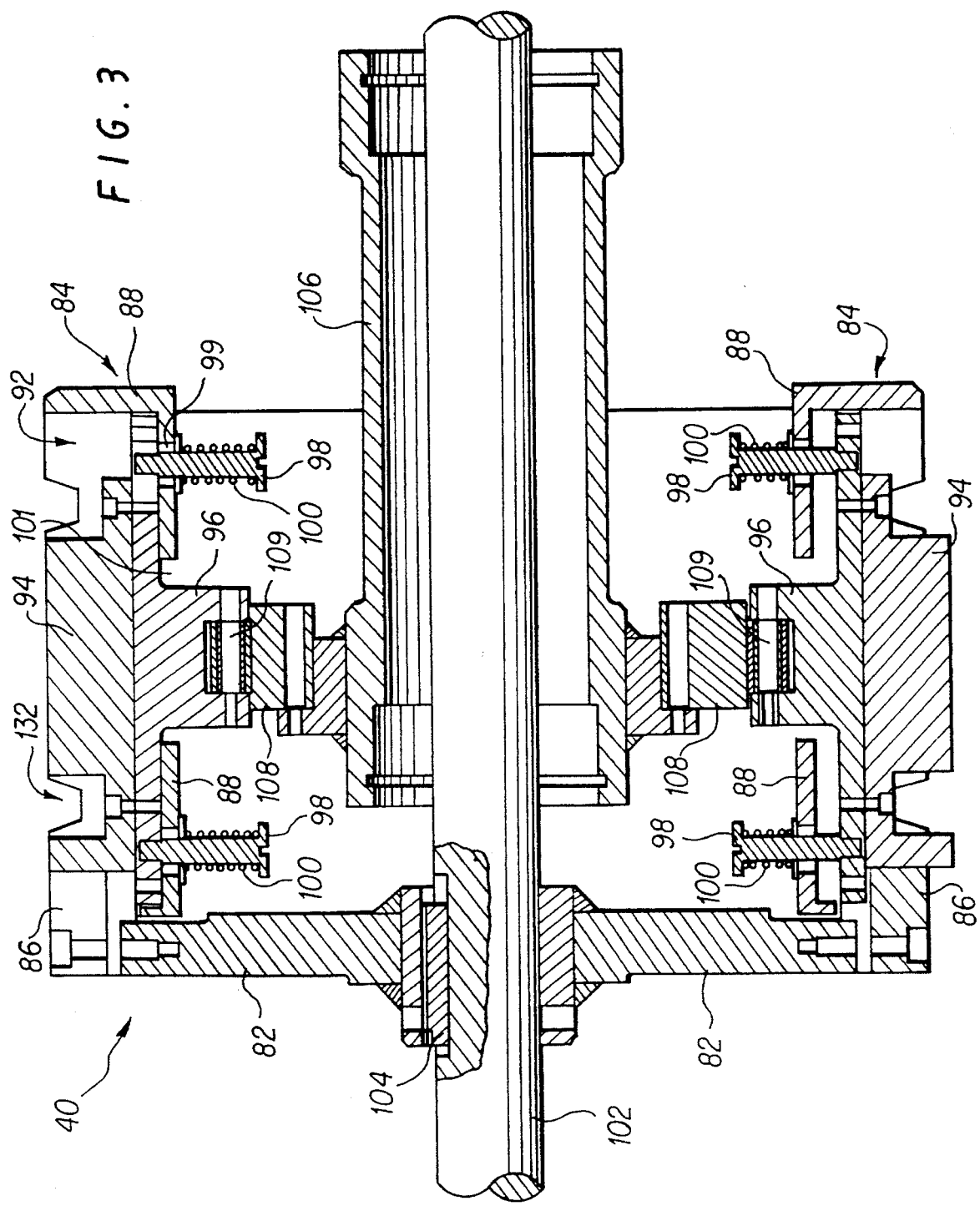
FIG. 3 is a cross-sectional view of a pleating drum taken along line 3—3 of FIG. 2.

With reference to FIGS. 2–6, the pleat forming station 14 includes a frame 80 which rotatably supports the female pleating roller 38 and the pleating drum 40. As shown in FIG. 3, pleating drum 40 includes a hub 82 and a surrounding pleating cylinder 84. The cylinder 84 includes an outer cylinder part 86 and an inner cylinder part 88 mounted to the outer cylinder 88 by fasteners 90 (shown in FIG. 5). A plurality of evenly-spaced slots 92 are formed around the outer periphery of the outer cylinder part 86. Teeth 94 are retractibly positioned in the slots 92.

Each tooth is elongated in an axial direction of drum 40 and has a generally rounded contour along its outer edge. The pleating teeth 94 are each attached to respective pleating teeth mounts 96 which are retractably held within the slots 92 by spring-biased, threaded fasteners 98 that are coupled to the inner pleating cylinder part 88 through openings 99. Springs 100 coaxially surround the fasteners 98 to bias the mounts 96 and teeth 94 toward a radially retracted position within the slot 92. A portion of the mounts 96 pass through an opening 101 in the inner cylinder part 88.

A shaft 102 supports and drives the hub 82 and pleating cylinder 84 via a shaft key 104 that engages the hub 82. The shaft 102 is rotated by a timing belt (not shown) coupled to the motor 36 in synchronous movement with the drive rollers 26 and 30 in the apparatus 10 as is well known in the art. A cylindrical cam housing 106, depicted in FIG. 3, is coaxially positioned about the shaft 102 and fixed to the frame 80 so that the housing 106 remains stationary. The cam housing 106 extends into the interior of the drum 40 where it fixedly supports a cam 108 which, as shown in phantom in FIG. 2, extends around approximately half the circumference of the cam housing 106, gradually increasing in radial thickness for about one-fourth the circumference and then gradually decreasing in radial thickness for the last one-fourth.

As the pleating cylinder 84 rotates, rollers 109 mounted in the bottom of the pleating teeth mounts 96 sequentially engage the stationary cam 108 and are gradually pushed radially outward thereby causing the teeth 94 to protrude from the cylinder 84. As shown in FIG. 2, the teeth 94 progressively protrude further from the pleating cylinder 84 in correspondence with the increasing thickness of the cam 108. The cam 108 is preferably aligned so that the teeth 94 are at their full extension when they engage the female pleating roller 38, as explained in more detail below, and are fully retracted before the pleating cylinder 84 engages the transfer roller 44. The teeth 94 gradually retract as the drum rotates about the cam after passing the female pleating roller 38. In the representation of the drum 40 in FIG. 3, the tooth 94 shown at the bottom of the drawing is depicted in a fully extended position, whereas the tooth 94 shown at the top of FIG. 3 is depicted in a retracted position.

Although the cam 108 is fixed to the cam housing 106 in the preferred embodiment, it should be appreciated that the cam 108 could be removable so that cams of different shapes and thickness graduation can be replaced in order to change the protruding pattern of the pleating teeth 94. For instance, the cam 108 could be altered so that the pleating teeth 94 extend from the cylinder 84 by a distance different than that shown in FIG. 2. Further, it should be appreciated that the distance between the teeth 94 could be altered by inserting an alternate cylinder into the drum 40 to replace the existing cylinder 84 to facilitate different spacing between the teeth 94. Alternatively, any number of teeth 94 could be removed from the cylinder 84 in order to alter the spacing of the teeth 94 and of the pleats 42 formed in the web 20.

The female pleating roller 38 is provided with recesses 110 which are shaped and spaced to interdigitate with the teeth 94 of the pleating drum 40 as the drum 40 rotates. The roller 38 may either be driven by the motor 36 in synchronization with the drum 40 or allowed to freely rotate with the drum 40 due to the engagement of the teeth 94 and recesses 110. When the web 20 is initially fed to the pleat forming station 14, it is pinched between the roller 38 and the drum 40, so that pleats 42 may be formed by the interaction of the teeth 94 and the recesses 110 of the roller 38.

Figure 4:
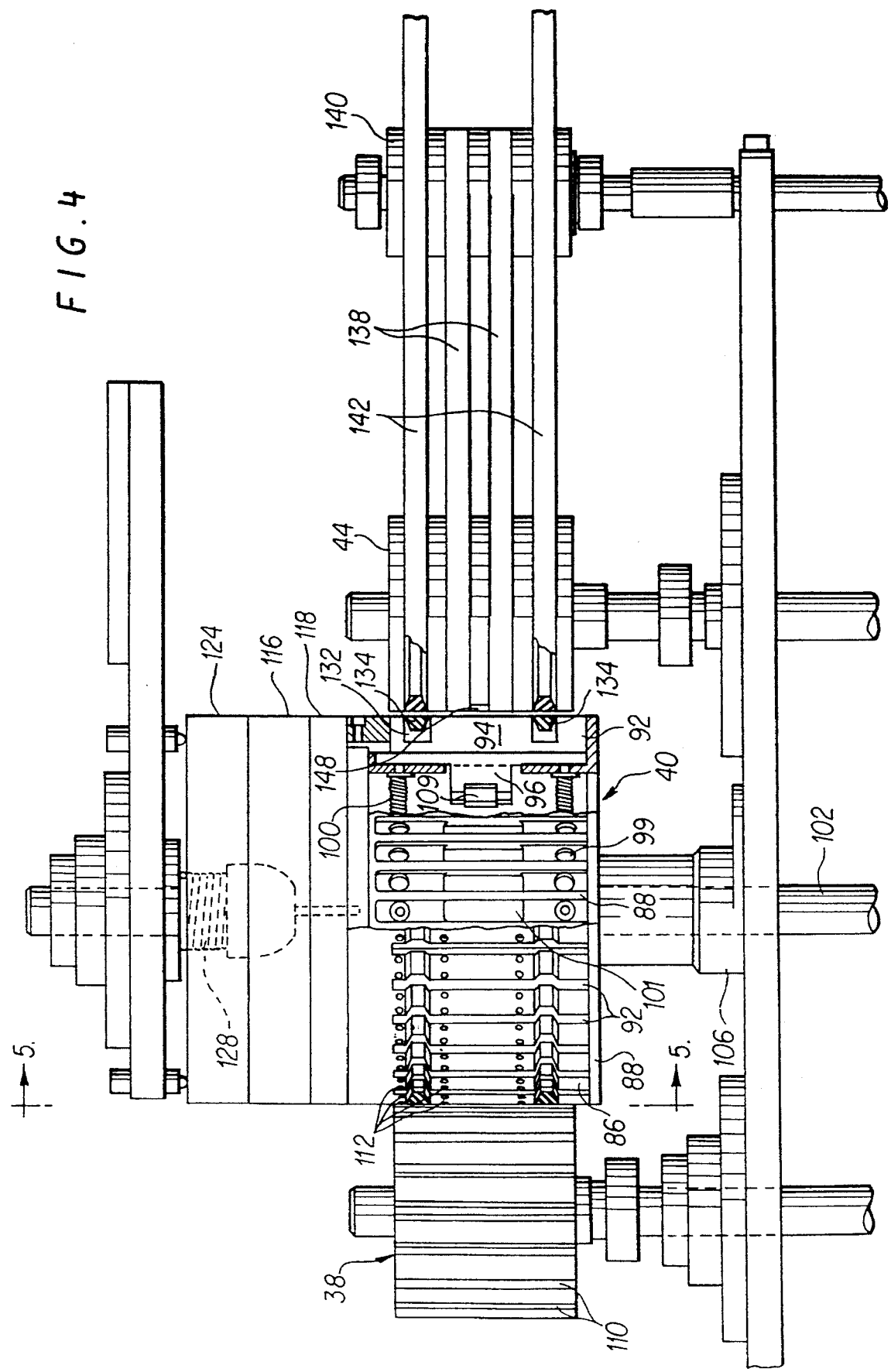
FIG. 4 is a partial sectional top view of a portion of the pleating apparatus shown in FIG. 1.
Figure 5:
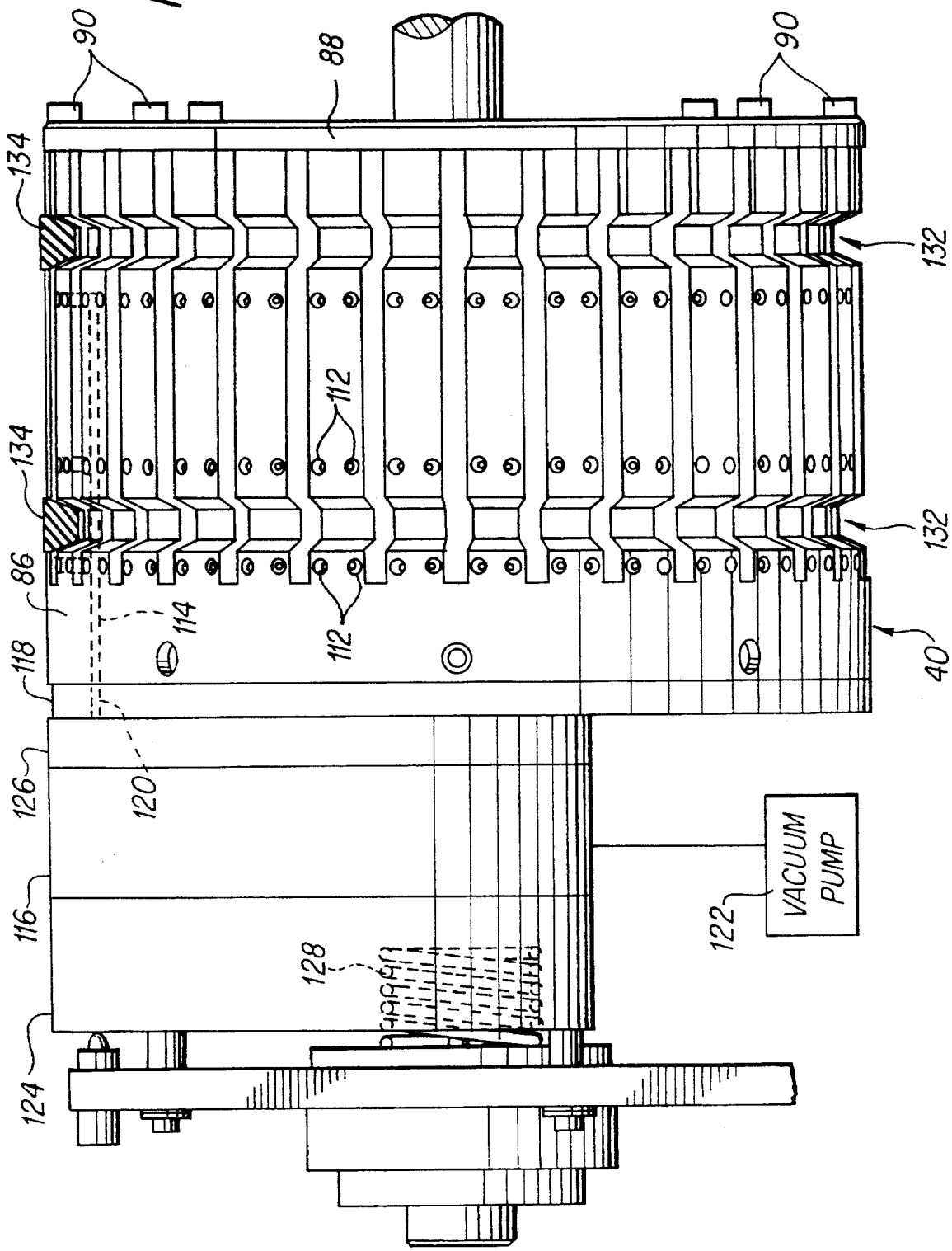
FIG. 5 is an end view of the pleating drum taken along 5—5 of FIG. 4.

The pleating material 20 is preferably retained on the pleating drum 40 by vacuum pressure after passing between the drum 40 and the female pleating roller 38. With particular reference to FIGS. 4 and 5, the outer cylinder part 86 is preferably provided with a plurality of vacuum holes 112 that are positioned between adjacent slots 92. It should be noted that, in FIGS. 4 and 5, details of the teeth 94 within the slots 92 of the cylinder 84 have been omitted for clarity except for a cut-away view of one tooth 94 in FIG. 4.

A plurality of bores 114 are formed within the outer cylinder part 86 between adjacent slots 92. For clarity, only one bore 114 is shown in phantom in FIG. 5. The bores 114 connect the vacuum holes 112 to a generally stationary crescent-shaped vacuum manifold 116 positioned adjacent the drum 40. The vacuum manifold 116 is also shown in phantom in FIG. 6.

Between the vacuum manifold 116 and drum 40 is a drum wear plate 118 which is attached to and rotates with the drum 40. The drum wear plate 118 has holes 120 which are aligned with the bores 114 of the pleating cylinder 84. The drum wear plate 118 is preferably made of a low friction metal, such as heat-treated steel.

A subatmospheric pressure is developed in the vacuum manifold 116 by a vacuum pump 122. Attached to the manifold 116 is a backing plate 124 and a vacuum wear plate 126 preferably made of a low-friction material such as a plastic material sold under the trade name Ryertex and marketed by Joseph T. Ryerson & Son, Incorporated of Chicago, Ill. The backing plate 124, the manifold 116 and the vacuum wear plate 126 are urged toward the drum wear plate 118 and the drum 40 by a spring 128 which acts against the vacuum manifold 116. The spring 128 causes the vacuum wear plate 126 to contact the drum wear plate 118. Both the manifold 116 and the vacuum wear plate 126 have aligned crescent-shaped apertures as depicted in phantom in FIG. 6 by reference numeral 130. The apertures 130 communicate with the holes 120 in the drum wear plate 118 so that a constant subatmospheric pressure is applied to the bores 114 and holes 112 of the drum cylinder 84. Due to the crescent shape, the apertures 130 are only in communication with the bores 114 for a portion of the drum. Sliding contact between the generally stationary vacuum wear plate 126 and the rotating drum wear plate 118 creates a seal that insures the strength of the vacuum provided to the vacuum holes 112 via the bores 114. It should be appreciated that, as shown in phantom in FIG. 5, for every three axially aligned holes 112, there is at most one bore 114; however, more bores could be used if desired.

With reference to FIGS. 3–5, the cylinder 84 and the teeth 94 are provided with radial recesses 132 to accommodate a pair of endless belts 134 which extend partially around the pleating drum 40 and hence the pleating cylinder 84. As depicted in FIGS. 1 and 2, the belts 134 partially bend around the transfer roller 44, but do not directly contact the roller 44 if a pleating web 20 is disposed therebetween as explained in greater detail below. In addition to extending around the drum 40, the belts 134 also wrap around the idler roller 78 (as shown in FIGS. 1 and 7) and extend past the backing roller 62 on two sides thereof (as shown in FIGS. 1, 2 and 7).

Figure 7:
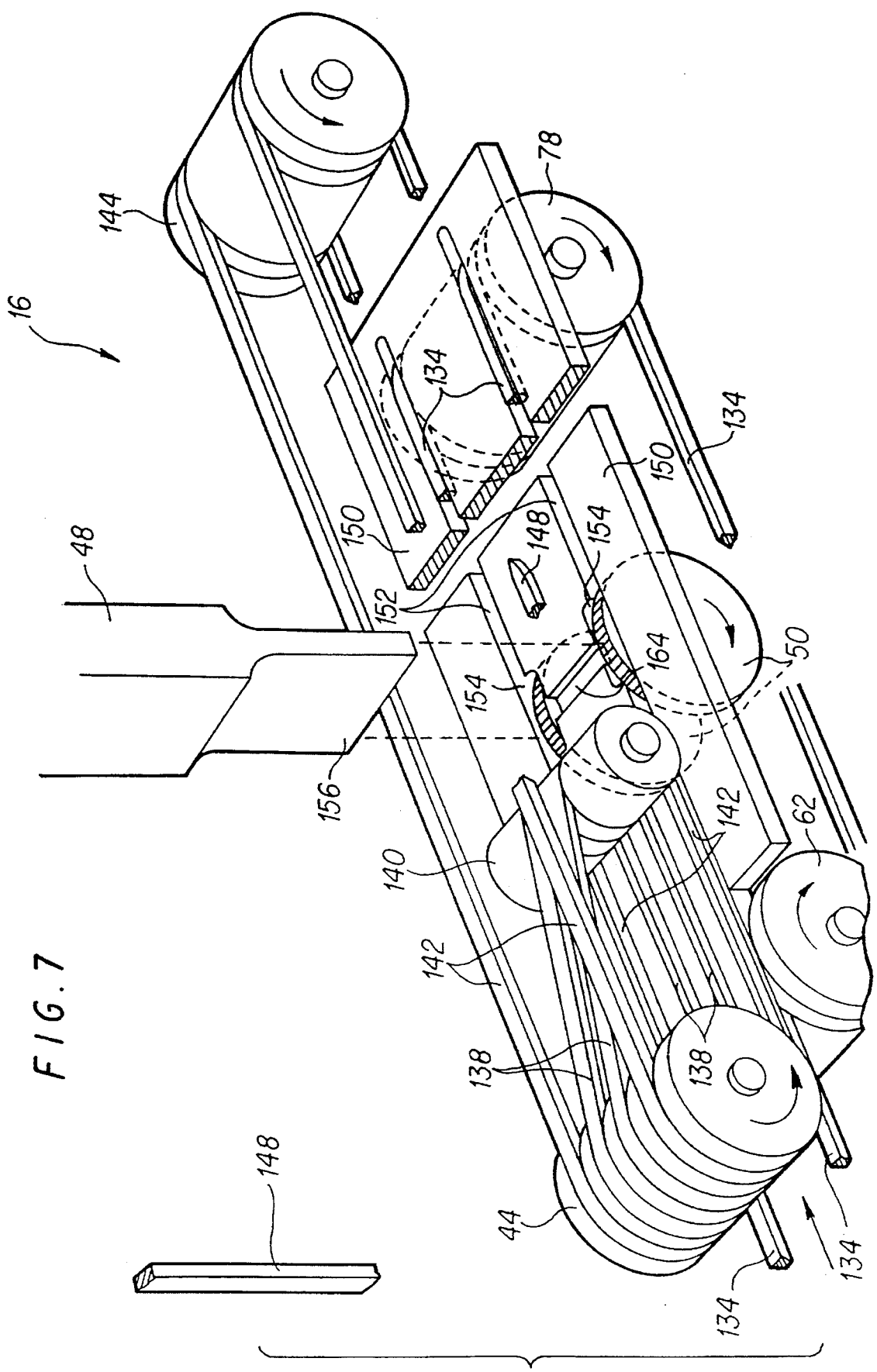
FIG. 7 is a partial sectional perspective view of a portion of the apparatus shown in FIG. 1.

A central second pair of endless belts 138 extends partially around the transfer roller 44 and an idler roller 140, and a third pair of belts 142 extends partially around the transfer roller 44 and around a first pinch roller 144 as is shown in FIGS. 1 and 7. The third belts 142 are spaced apart from one another by a distance substantially equal to that of the distance between the first belts 134. The second central belts 138 are spaced apart a shorter distance so that the belts 138 awe positioned substantially between the belts 134 and 142 as shown in FIGS. 4 and 7. As explained in further detail below, the belts 134, 138 and 142 serve to support and carry the web 20 and assist in folding the pleats 42. Preferably, the belts 134, 138 and 142 are V-belts having a 3L cross-section and are made of a urethane material.

With reference now to FIGS. 2, 6 and 7, a bracket 146 supports a long thin strap 148 that extends from the bracket 146, around transfer roller 44, and to approximately a point just past the welding device 48. Preferably, the strap 148 extends between the second central belts 138. When a pleating material web 20 is fed into the device, it is captured between the strap 148 and the first belts 134, with the strap 148 contacting the upper surface of the web 20 after the pleats 42 have been formed by the teeth 94. As the web 20 approaches the transfer roller 44, the strap 148 assists the pleats 42 in folding down against the web 20 so that the pleats lie flat, thus forming the folded pleats 46. The strap 148 is generally held stationary by the bracket 146 and by the welding device 48 and a plate 150 which, as explained further below, pinch the end of the strap therebetween. As the web 20 passes under the strap 148, the folded pleats 46 are maintained flat against the web 20 by the strap until the welds are formed at the bonding station 16.

Figure 9:
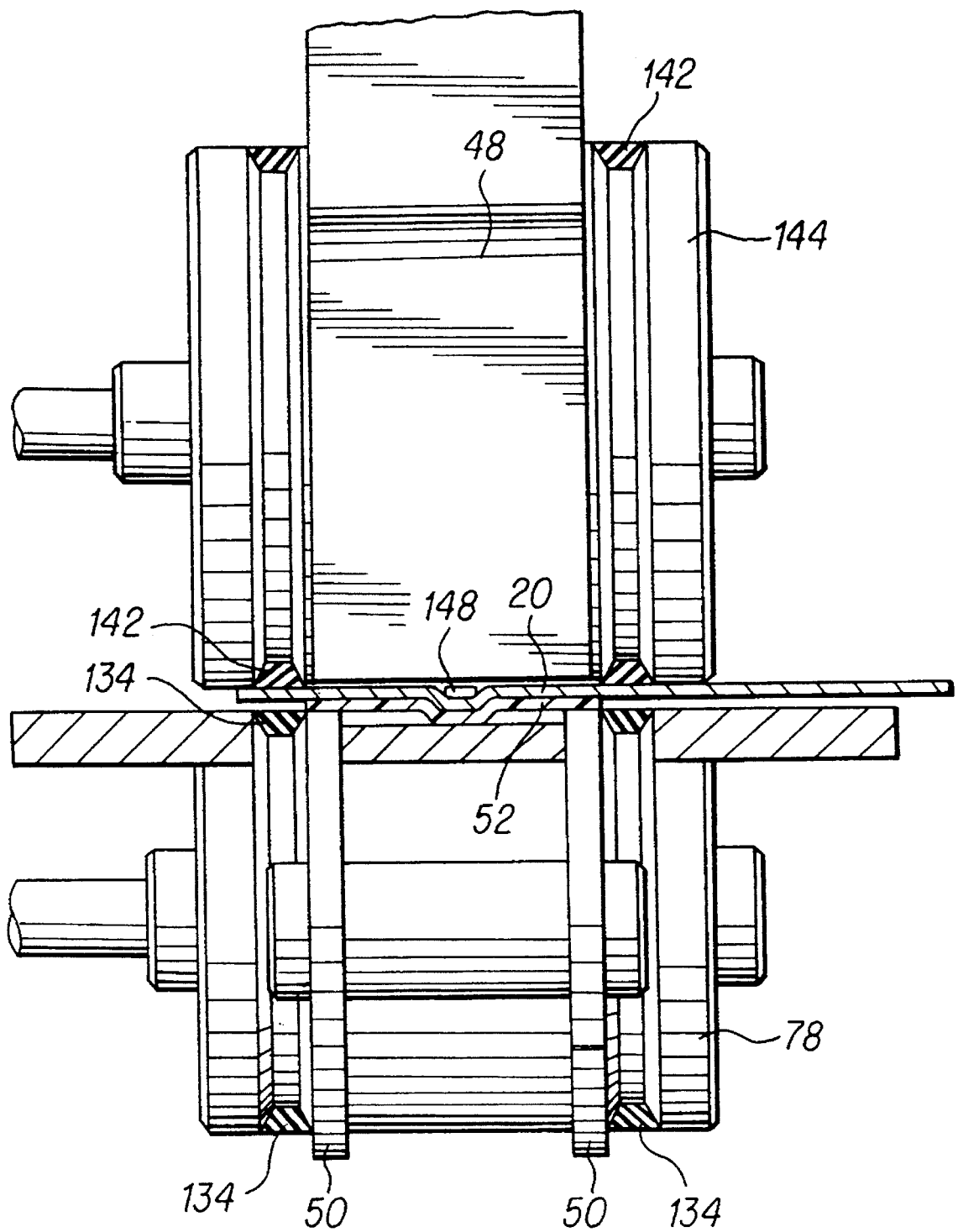
FIG. 9 is a cut-away enlarged end view of the bonding station taken along line 9—9 of FIG. 8.

Referring to FIGS. 7–9, the plate 150 extends from approximately the backing roller 62 to just beyond the roller 78 and supports the web 20 from after the pleats 46 have been formed until the pleats 46 are bonded at the bonding station 16. The plate 150 has a pair of grooves 152 formed on an upper surface of the plate 150 to accommodate the first belts 134 such that the belts 134 contact the underside of the web 20 as the web 20 travels to the bonding station 16. The plate 150 further includes two holes 154 that allow the anvils 50 to directly contact the web 20 during welding.

It should be noted that the bonding station 16 is depicted in FIG. 7 with the pleating and backing webs 20 and 52 removed for greater clarity. Furthermore, in FIG. 7, the tip 156 of the horn of the ultrasonic welding apparatus 48 is in a retracted, elevated position, again to provide greater clarity. In addition, only two segments, a vertical segment and an end segment, of the strap 148 are depicted, with the remainder of the strap 148 not being shown.

With reference to FIGS. 8 and 9, the anvils 50 are mounted on a bracket 158 that is spring biased in a direction shown by arrow 160, by a spring 162. The spring 162 urges the anvils 50 upward through the plate holes 154 and toward the lower tip 156 of the ultrasonic welding device 48. Layered vertically between the plate 150 and the welding device 48 are the strap 148, pleating web 20, and backing web 52. The strap 148, however, is positioned between the anvils 50 so that it is not pinched between the anvils 50 and the tip 156 of the welding device 48, but rather only between the plate 150 and the tip 156. Preferably, the plate 150 is provided with a groove 164 at a position directly below the welder tip 156 in order to provide clearance for the strap 148 and, therefore, allow a proper pressure to be established between the anvils 50 and the welder tip 156 so that a sufficient bond can be formed between the pleating material 20 and the backing material 52.

Preferably, the anvils 50 are not driven but are allowed to freely rotate under the friction force established between the backing web 52 and the anvils 50 as the backing web is drawn over and past the anvils 50. In this way, the anvils 50 move in synchronization with the movement of web 52 and, therefore, more consistent welds can be made.

During operation, the welding device 48 remains stationary in a lowered position as shown in FIG. 8. Preferably, the welding device 48 may be adjusted to different heights to accommodate varying combinations of thicknesses of webs 20 and 52 so that, when in an upper remote position, the webs 20 and 52 may be fed into the bonding station 16.

A second pinch roller 166 is provided adjacent and below the first pinch roller 144, and the two pinch rollers 144 and 166 are power driven synchronously with other driven rollers of the apparatus 10 by timing belts and an electric motor as is known in the art. The pinch rollers 144 and 166 draw the webs 20 and 52 out and away from the bonding station 16 and provide the webs 20 and 52 with the proper tension necessary to facilitate the bonding process in the bonding station 16 as is well known in the web processing art. If the double-sided tape 66 is to be applied to the backing web 52, it preferably is pinched between the roller 144 and 166 also and is drawn from the tape roll 72 under their influence.

In a preferred method of operation, the web 20 is drawn from the feed roll 18 and subsequently delivered to the pleating station 14 where the web 20 is wrapped partially around the female pleating roller 38 before being fed between the roller 38 and the pleating drum 40. The roller 38 and pleating drum 40 are synchronously rotated such that the recesses 110 of the female roller 38 mesh with the teeth 94 of the pleating drum 40. The teeth 94 are fully extended at the point where the roller 38 contacts the drum 40, thus causing portions of the web 20 to be captured in the recesses 110 of the roller 38 and wrapped about the teeth 94 to form pleats 42. At the point where the roller 38 and the drum 40 interact, a vacuum is applied to the drum vacuum holes 112 positioned between the teeth 94 via a communication established with the vacuum manifold 116, thus drawing the web material between the pleats 42 against the outer periphery of the drum 40. Vacuum is applied to the web 20 via the holes 112 as the web 20 traverses the drum 40 until the web 20 reaches the transfer roller 44, where the vacuum manifold 116 no longer communicates with the holes 112 (see FIG. 6).

As the web 20 approaches the transfer roller 44, the pleats 42 contact the strap 148, and the strap 148 urges the pleats 42 flat against the surface of the web 20. When the web 20 reaches the transfer roller 44, the belts 142 contact the upper side of the web 20 where the folded pleats 46 are located and the belts 134 contact the lower opposing side, thus capturing the web 20 as it leaves the drum 40 and holding the pleats 46 folded against the web. The central belts 138 also contact the web 20 and the folded pleats 46, thus also assisting in holding the folded pleats 46 in folded contact with the web 20. The belts 134, 138 and 142 transport the web to the bonding station 16.

The web of backing material 52, which is narrower than the web 20 and the distance between the belts 134, is delivered to the bonding station 16 via the backing roller 62. The roller 62 carries the backing web 52 into direct contact with the underside of the web 20, between the web 20 and the plate 150. The backing material 52, supported underneath by the plate 150, extends between the belts 134 which run through the grooves 152 of the plate 150. The plate 150 has a smooth upper surface that allows the backing web 52 to slide smoothly across the plate 150 with little friction resistance. The central belts 138, which are closer together than the belts 134, contact the upper surface of the web 20 and act downwardly against the web 20 in a region of the web 20 over top of the backing web 52, thus trapping the webs 20 and 52 between the belts 138 and the upper surface of the plate 150. Contact between the webs 20 and 52 due to the action of the belts 138 against the web 20 insures the synchronous progression of backing web 52 and web 20 to the bonding station 16.

The ultrasonic welding device 48 continuously vibrates at a high frequency as the webs 20 and 52 are passed between the welding device 48 and the anvils 50. During passage of the two webs 20 and 52 between the welding device 48 and the anvils 50, the two webs 20 and 52 are fused together and the folded pleats 46 are bonded against the upper surface of web 20. Two rows of welds, as explained further below, are formed in correspondence with the two anvils 50. The shape or contour of the welds is determined by the surface contour of the anvils 50 as is known in the art. The spacing between the two rows of welds is determined by the spacing between the two anvils 50. After welding, the joined webs 20 and 52 are drawn from the bonding station 16 by the driven pinch rollers 144 and 166, after which the combined webs may be cut or boxed.

Optionally, double-sided adhesive tape 66 may be withdrawn from the feed roll 72 and the exposed side 68 thereof adhered to the backing web 52 at the spring-loaded roller 76 and roller 78. The tape is then drawn from the apparatus 10 together with the webs 20 and 52 by the pinch rollers 144 and 166.

Figure 10:
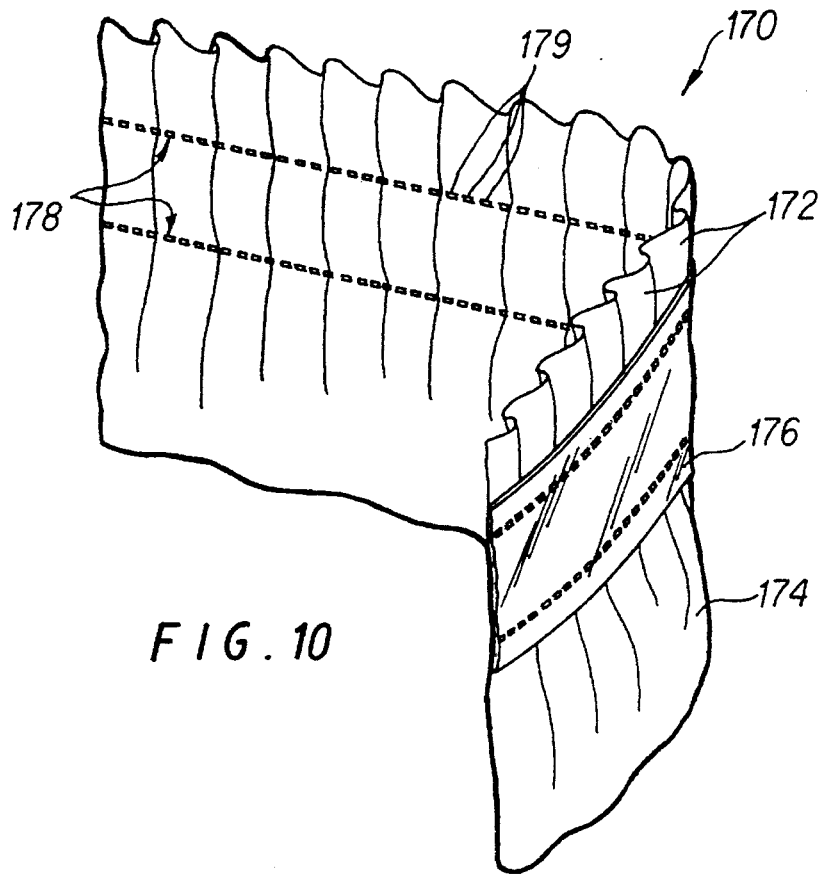
FIG. 10 illustrates an embodiment of a pleated article produced by the apparatus shown in FIG. 1.

FIG. 10 illustrates a preferred embodiment of a resulting sheet-like article 170 (consisting of a length of table skirting material) having pleats 172 formed by the apparatus 10. As shown, the article 170 includes a thermoplastic pleated sheet 174, a backing strip 176, and two rows 178 of welds 179. The welds serve to both hold the pleats 172 in a folded-over arrangement, by bonding the pleats 172 to the sheet 174 along the two rows, and to bond the backing strip 176 to the sheet 174. As discussed above, the spacing between the welds 179 and between the rows 178 of welds is determined by the configuration of the anvils 50 and the spring therebetween.

The pleats 172 of the resulting article 170 have a relatively uniform spacing and size and, therefore, provide a more pleasing overall appearance. Furthermore, the ultrasonic welds 179 provide a more secure bond between the sheet 174 and the pleats 172 and the backing strip 176.

Figure 11:
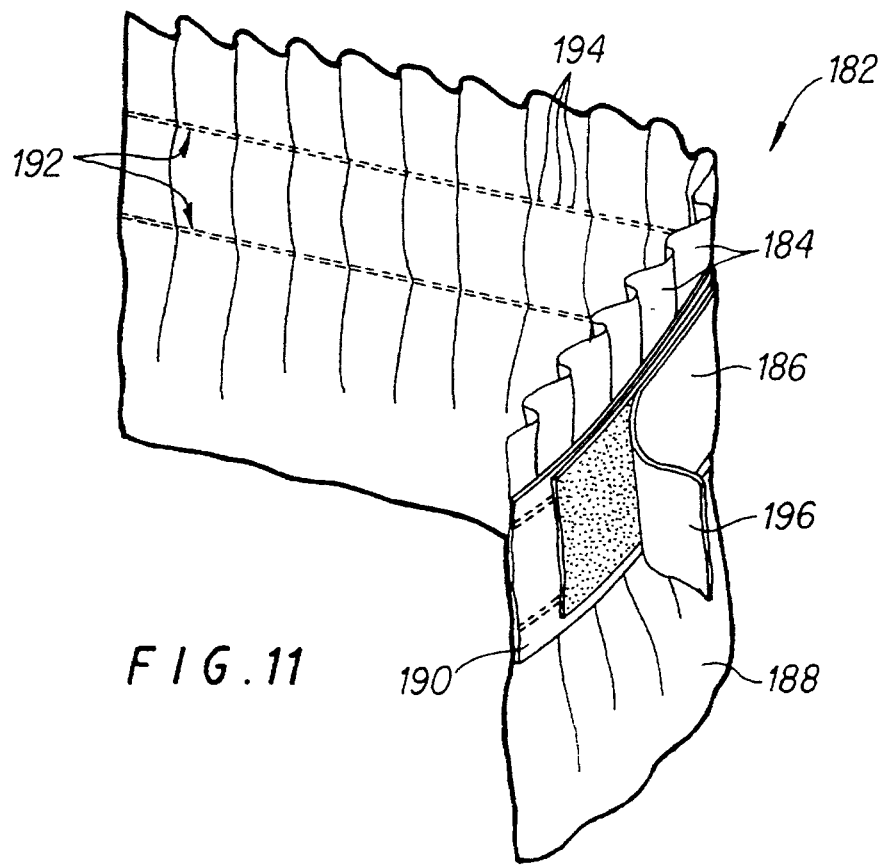
FIG. 11 illustrates an alternate embodiment of a pleated article produced by the apparatus shown in FIG. 1.

FIG. 11 illustrates another preferred embodiment of a sheet-like article 182 having pleats 184 formed by the apparatus 10. The article 182 is similar to the article 170 of FIG. 10 but is provided with a double-sided tape strip 186. The article 182 includes a thermoplastic pleating sheet 188, a backing strip 190, and two rows 192 of ultrasonic welds 194. The tape strip 186 is similar to the tape 66 described herein and includes a liner 196 that may be removed to expose the adhesive on one side of the tape strip so that the article 182 may be adhered to a surface.

It should be appreciated that many variations of articles can be formed by the apparatus and method described herein by making various modifications to the apparatus and/or to the choice of materials used. For example, the spacing of the pleats can be changed by changing the number of teeth 94 positioned in the pleating drum 40, and the size of the pleats can be changed by replacing the existing cam 108 with a different cam or by using different sized teeth 94. Furthermore, the pleats and backing web could be bonded using a different bonding device than the ultrasonic welder 48.

The pleating web and backing strip have previously been described as preferably being made of thermoplastic material, but may be made of any of a variety of materials, synthetic or natural, depending on the device used to bond the materials. In addition, although the double-side adhesive tape has been described as preferably being applied to the backing strip, it may also be applied directly to the pleating web and the backing web omitted from the article. It should also be understood that the invention could be provided with any of a number of additional stations to facilitate printing or embossing of the material prior to forming of the pleats in the web 24.

Although the present invention has been described with reference to preferred embodiments, the invention is not limited to details thereof. Various substitutions and modifications will occur to those of ordinary skill in the art, and all such substitutions and modifications are intended to fall within the scope of the invention as defined in the appended claims.

What is claimed is:

1. A method for forming a pleat in a sheet material, comprising the steps of:

feeding a web of sheet material to a pleating surface;

extending at least one pleating tooth carried by the pleating surface into said web, thereby altering the shape of the web to form a pleat;

retracting said pleating tooth from said web after said pleat has been formed;

holding the pleated web against the pleating surface following retraction of said pleating tooth from said web by applying vacuum pressure to said web on both sides of said pleat but not directly below said pleat;

feeding the pleated web from the pleating surface to a bonding device; and bonding said pleat by operating the bonding device to prevent unraveling of said pleat.

2. The method of claim 1, further comprising the step of folding the pleat formed by said at least one pleating tooth so that the pleat lies flat before the bonding step.

3. The method of claim 1, further comprising the step of feeding a web backing material to said bonding device and bonding the backing material to the pleated material.

4. The method of claim 1, further comprising the step of applying a double-sided adhesive tape to the pleated sheet material after said pleat has been bonded.

5. The method of claim 1, wherein said web of sheet material comprises a thermoplastic material, and wherein said bonding device comprises an ultrasonic bonding device.

6. The method of claim 5, wherein said web of thermoplastic sheet material is fed continuously to said pleating surface and to said ultrasonic bonding device, and wherein said ultrasonic bonding device comprises an ultrasonic welding horn and an opposed rotary anvil disposed on opposite sides of said web and maintained in continuous contact therewith during operation of said ultrasonic bonding device.

7. The method of claim 1, wherein said bonding step is carried out at a location downstream from said pleating surface in the feed direction of said web.

\* \* \* \* \*